United States Patent
Cho et al.

(10) Patent No.: US 9,191,116 B2
(45) Date of Patent: Nov. 17, 2015

(54) ORTHOGONAL FREQUENCY DIVISION MULTIPLE ACCESS-PASSIVE OPTICAL NETWORK COMPRISING OPTICAL NETWORK UNIT AND OPTICAL LINE TERMINAL

(71) Applicant: Electronics and Telecommunications Research Institute, Daejeon-si (KR)

(72) Inventors: Seung-Hyun Cho, Daejeon-si (KR);
Seung-Il Myong, Daejeon-si (KR);
Kyeong-Hwan Doo, Daejeon-si (KR);
Jie-Hyun Lee, Daejeon-si (KR);
Sang-Soo Lee, Daejeon-si (KR);
Jong-Hyun Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 6 days.

(21) Appl. No.: 14/050,465

(22) Filed: Oct. 10, 2013

(65) Prior Publication Data
US 2014/0199074 A1 Jul. 17, 2014

(30) Foreign Application Priority Data
Jan. 17, 2013 (KR) .................. 10-2013-0005469

(51) Int. Cl.
*H04J 14/02* (2006.01)
*H04B 10/27* (2013.01)
*H04B 10/548* (2013.01)
*H04L 27/26* (2006.01)

(52) U.S. Cl.
CPC .............. *H04B 10/27* (2013.01); *H04B 10/548* (2013.01); *H04L 27/2649* (2013.01); *H04L 27/2697* (2013.01)

(58) Field of Classification Search
CPC . H04J 14/023; H04J 14/0232; H04J 14/0235; H04J 14/0242; H04J 14/0245; H04J 14/0247; H04J 14/0249; H04J 14/0252; H04J 14/0298
USPC .............................. 398/58, 67, 68, 76, 79, 89
See application file for complete search history.

(56) References Cited

U.S. PATENT DOCUMENTS

| | | | |
|---|---|---|---|
| 7,978,975 B2 | 7/2011 | Qian et al. | |
| 8,111,993 B2 * | 2/2012 | Lowery et al. | 398/81 |
| 8,233,797 B2 | 7/2012 | Qian et al. | |
| 2003/0021245 A1 * | 1/2003 | Haumonte et al. | 370/330 |
| 2004/0001427 A1 * | 1/2004 | Belotserkovsky et al. | 370/208 |
| 2008/0267630 A1 * | 10/2008 | Qian et al. | 398/89 |
| 2009/0067833 A1 * | 3/2009 | Bunge et al. | 398/43 |
| 2009/0097852 A1 | 4/2009 | Qian et al. | |

(Continued)

OTHER PUBLICATIONS

B. Charbonnier et al., "Self-Coherent Single Wavelength SC-FDMA PON Uplink for NG-PON2", Optical Fiber Communication Conference and Exposition (OFC/NFOEC), 2012 and the National Fiber Optic Engineers Conference, pp. 1-3, Mar. 4-8, 2012.

*Primary Examiner* — Dalzid Singh
(74) *Attorney, Agent, or Firm* — Rabin & Berdo, P.C.

(57) ABSTRACT

An orthogonal frequency division multiple access-passive optical network including a plurality of optical network units each configured to generate orthogonal frequency division multiplexed signals, which are allocated thereto, based on a central frequency for frequency division multiplexing that is allocated in advance, and to use the generated signals in upstream transmission.

16 Claims, 5 Drawing Sheets

(56) References Cited

U.S. PATENT DOCUMENTS

| | | | |
|---|---|---|---|
| 2010/0027994 A1* | 2/2010 | Xu et al. ........................ | 398/43 |
| 2011/0103794 A1* | 5/2011 | Gottwald ........................ | 398/58 |
| 2012/0230693 A1* | 9/2012 | Zou ................................ | 398/66 |
| 2013/0045012 A1* | 2/2013 | Kanonakis et al. ............. | 398/66 |

* cited by examiner

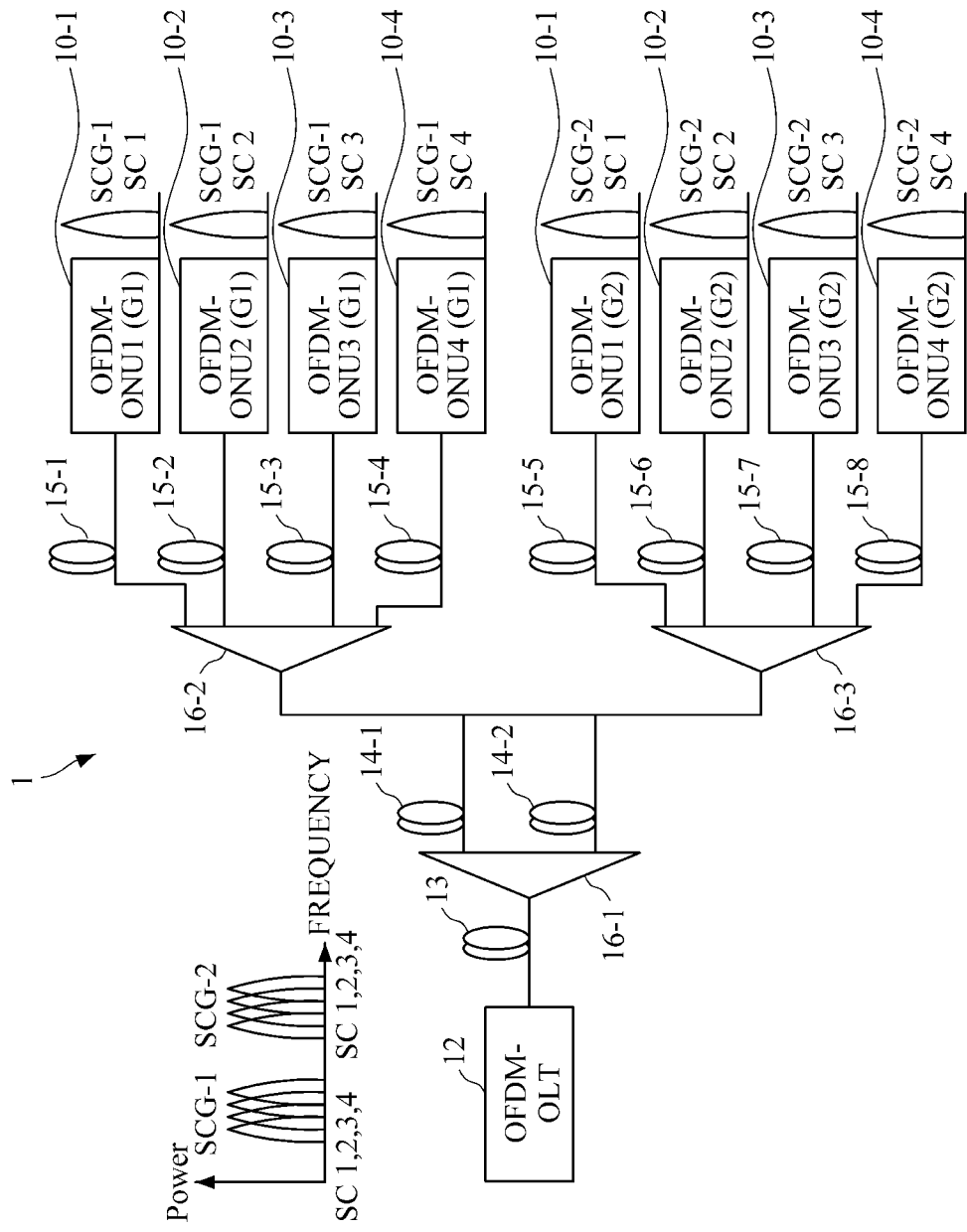

ORTHOGONAL FREQUENCY DIVISION MULTIPLE ACCESS-PASSIVE OPTICAL NETWORK COMPRISING OPTICAL NETWORK UNIT AND OPTICAL LINE TERMINAL

CROSS-REFERENCE TO RELATED APPLICATION

This application claims priority from Korean Patent Application No. 10-2013-0005469, filed on Jan. 17, 2013, in the Korean Intellectual Property Office, the entire disclosure of which is incorporated herein by reference for all purposes.

BACKGROUND

1. Field

The following description relates to technology for an orthogonal frequency division multiple access-passive optical network (OFDMA-PON), and more particularly, to technology for an upstream optical link structure of OFDMA-PON and upstream transmission of data, capable of enhancing economic efficiency.

2. Description of the Related Art

Orthogonal frequency division multiplexing, hereinafter referred to as OFDM, is a modulation method for multiplexing high-speed transmission signals with multiple orthogonal narrowband subcarriers.

An orthogonal frequency division multiple access-passive optical network, hereinafter referred to as an OFDMA-PON, which is technology to apply OFDM to a PON, represents one type of a next-generation optical access network for high-speed and long-reach transmission. OFDMA-PON, by using an intensity modulation/direct detection (IM/DD) scheme ensuring cost-effectiveness, maximizes transmission efficiency, enables useful control of network resources, and requires no additional compensation technology for long-distance/high-speed transmission.

Even with the benefits as the above, the commercialization of OFDMA-PON has been delayed due to many reasons, one of which is the absence of a high-speed digital signal processor, hereinafter referred to as a high-speed DSP, enabling real-time operation, and the absence of a data converter (an analog-to-digital converter and a digital-to-analog converter) ensuring speed support for high-speed sampling of several tens of giga bits per second.

Various methods to overcome these shortcomings have been suggested. One of the methods is to multiplex in a manner to reduce physical bandwidth of OFDM signals by using both OFDM modulation and FDM multiplexing so that transmission is achieved at a relatively lower cost and sampling speed of the data converter. Another method is to greatly reduce the size of a fast Fourier transform (FFT), which is required for realizing an OFDM baseband modem, so that a real-time operated DSP is implemented using a field-programmable gate array (FPGA) and etc.

SUMMARY

The following description relates to an upstream optical link structure and upstream transmission method having a simplified configuration and ensuring cost-effectiveness, for realizing an orthogonal frequency division multiplexing-passive optical network that is a next-generation optical network ensuring a high-capacity and long reach transmission.

In one general aspect, an optical network unit of an orthogonal frequency division multiple access-passive optical network includes a digital signal processor, a digital-to-analog converter, and an electrical IQ-modulator. The digital signal processer may be configured to generate orthogonal frequency division multiplexing subcarriers. The digital-to-analog converter may be configured to convert an orthogonal frequency division multiplexed baseband signal having passed through the digital signal processor into an analog form. The electrical IQ-modulator may be configured to perform a frequency up-shift on the orthogonal frequency division multiplexed signal, which is converted into the analog form, for frequency division multiplexing that is allocated to each optical network unit, so that the subcarriers are allocated for a full size of an inverse fast Fourier transform.

The digital signal processor may include an inverse fast Fourier transform unit configured to generate a plurality of orthogonal frequency division multiplexing subcarriers.

The available frequency range of the orthogonal frequency division multiplexed subcarriers for FDM may be allocated by an optical line terminal so as to differ with center frequencies used in each optical network unit without overlapping each other.

If center frequencies the orthogonal frequency division multiplexed subcarriers for FDM generated in each optical network unit are the same, allocated ranges of the orthogonal frequency division multiplexed subcarriers may not overlap each other according to a priority order set by the optical line terminal.

The electrical IQ-modulator may perform a frequency up-shift on the orthogonal frequency division multiplexed subcarriers, which are generated by the inverse fast Fourier transform unit, to form orthogonal frequency division multiplexed sub-carriers.

The optical unit network may include an optical signal processor configured to transmit, upstream light, the orthogonal frequency division multiplexed signal that has been subject to the frequency up-shift by the electrical IQ-modulator. In this case, a light source generating an optical signal in the optical signal processor may be a directly modulated light source capable of intensity modulation. The optical signal processor may modulate the electrical orthogonal frequency division multiplexed signal into an optical signal having a single wavelength that is allocated to be the same for each optical network unit, and may transmit the intensity modulated optical signal toward upstream direction.

The optical unit network may include a low-pass filter configured to filter the aliasing component of the orthogonal frequency division multiplexed signal that has passed through the digital processor, and to transmit the filtered orthogonal frequency division multiplexed signal to the digital-to-analog converter.

In another general aspect, an optical line terminal of an orthogonal frequency division multiple access-passive optical network includes an optical receiver, an electrical IQ-demodulator, an analog-to-digital converter and a digital signal processor. The optical receiver may be configured to detect upstream optical signals that are transmitted by respective optical network units, and to convert the detected upstream optical signals into electrical signals. The electrical IQ-demodulator may be configured to perform a frequency down-shift on the orthogonal frequency division multiplexed signals converted by the optical receiver, on a specific frequency basis for frequency division multiplexing that are allocated in advance, and to divide the frequency down-shifted orthogonal frequency division multiplexed signals into a I-component and a Q-component. The analog-to-digital converter may be configured to convert the orthogonal frequency division multiplexed signals divided by the electrical IQ-demodulator into a digital form. The digital signal processor may be configured to demodulate the orthogonal frequency division multiplexed signals converted into the digital form by the analog-to-digital converter.

The optical line terminal may further include an electrical splitter configured to divide the orthogonal frequency division multiplexed signals converted into the electrical signals by the optical receiver into a predetermined number of orthogonal frequency division multiplexed signals, the predetermined number corresponding to the number of frequency band used for the frequency division multiplexing, and to distribute the divided orthogonal frequency division multiplexed signals among a plurality of electrical IQ-demodulators.

The digital signal processor, which is provided in plural, may demodulate the orthogonal frequency division multiplexed signals distributed by the electrical splitter on a respective center frequency basis employed for the frequency division multiplexing.

The optical line terminal may further include a controller configured to group the respective optical network units and allocate grouped frequency division multiplexed signals to the grouped respective optical network units, wherein the grouped frequency division multiplexed signals comprise a plurality of orthogonal frequency division multiplexed subcarriers.

The controller may determine specific center frequencies of the grouped frequency division multiplexed signals among the grouped respective optical network units, and determine allocation and operation of orthogonal frequency division multiplexing subcarriers in the grouped frequency division multiplexed signals.

The optical line terminal may further include a low-pass filter configured to filter aliasing components of the orthogonal frequency division multiplexed signals divided into the I-component and Q-component by the electrical IQ-demodulator, and transmit the filtered the orthogonal frequency division multiplexed signals to the analog-to-digital converter.

In another general aspect, an orthogonal frequency division multiple access-passive optical network includes a plurality of optical network units, a plurality of passive optical splitters, and an optical line terminal. The plurality of optical network units may be configured to generate orthogonal frequency division multiplexed signals, which are allocated to the plurality of optical network units, on a specific center frequency basis for frequency division multiplexing that are allocated in advance, and to use the generated orthogonal frequency division multiplexed signals for upstream transmission. The plurality of passive optical splitters may be configured to deliver the orthogonal frequency division multiplexed signals generated by the plurality of optical network units to an optical line terminal. The optical line terminal may be configured to group the plurality of optical network units and allocate the orthogonal frequency division multiplexed signals among the grouped optical network units.

As is apparent from the above description, all ONUs in the OFDMA-PON are provided with light sources of the same wavelength, thereby eliminating the need for inventory problem and thus enabling a cost effective network to be constructed.

In addition, an OFDM signal, instead of a DMT signal which has been used in supporting the conventional intensity modulation/direct detection, is transparently used for transmission, so that a high-speed DSP is cost-effectively used, and subcarriers corresponding to the entire size of the FFT are utilized for transmission, thereby effectively using network resources.

Further, since upstream transmission is implemented by grouped respective OFDM signals and ONUs using a FDM method, the sampling speed of a data converter (ADC or DAC) of a baseband modem located at an ONU and located at an OLT is reduced, thereby constructing a cost effective network. Further, such a grouping method reduces the number of subcarriers that need to be processed at the same time in a DSP block, thereby contributing to construction of a cost-effective optical access network.

Further, transmission within a sub-carrier group subjected to the FDM is achieved using OFDM signals, thereby enabling long-reach and higher-capacity transmission, which is one of the benefits of OFDM based modulation and multiplexing scheme.

Other features and aspects will be apparent from the following detailed description, the drawings, and the claims.

BRIEF DESCRIPTION OF THE DRAWINGS

FIG. 1 is a block diagram illustrating an OFDMA-PON in accordance with one embodiment of the present disclosure.

Figure 2A:
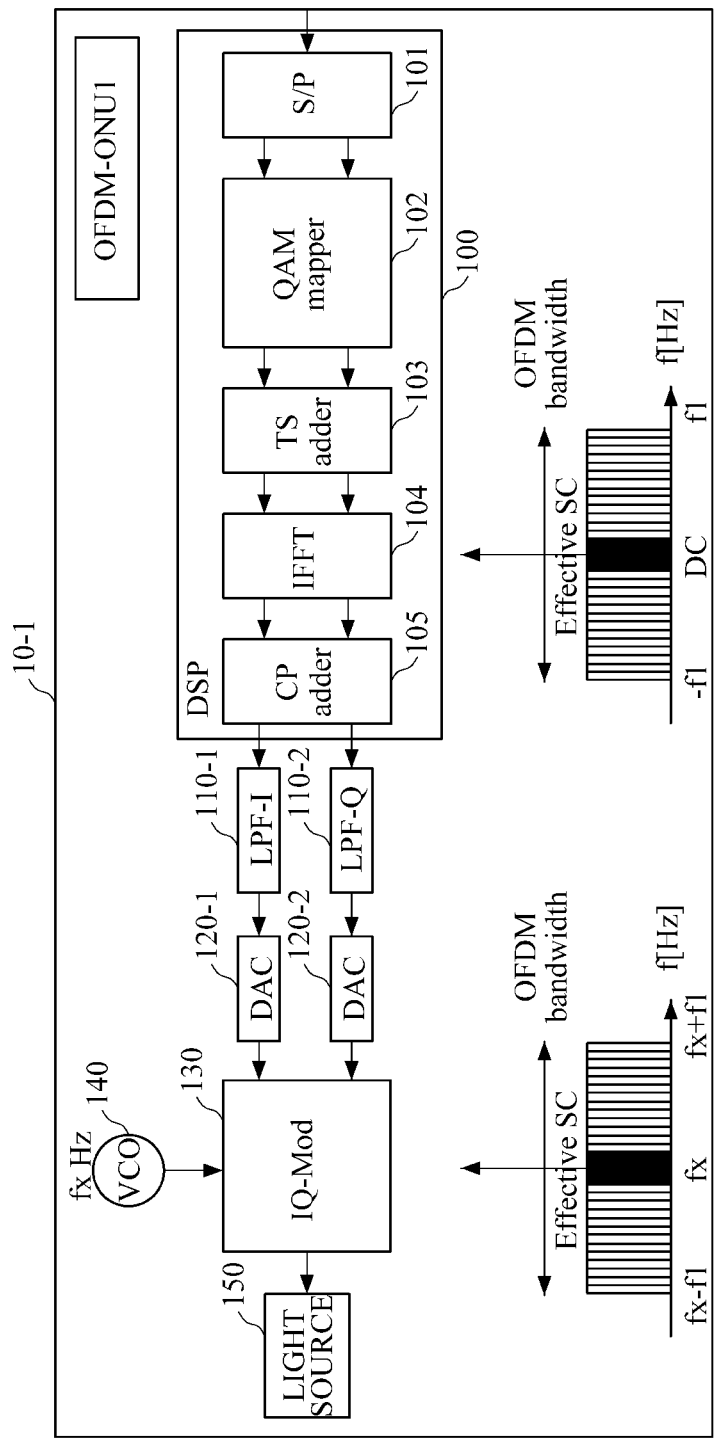
FIGS. 2A to 2C are detail function block diagrams illustrating a transmitter part of an OFDM-ONU in accordance with one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness. In addition, terms used herein are defined in consideration of functions in the present invention and may be changed according to the intentions of a user or an operator or conventional practice. Therefore, the definitions must be based on content throughout this disclosure.

FIG. 1 is a block diagram illustrating an Orthogonal Frequency Division Multiple Access-Passive Optical Network 1, hereinafter referred to as an OFDMA-PON, in accordance with one embodiment of the present disclosure.

The following description concerns an upstream transmission scheme, link and terminal configuration of the OFDMA-PON system 1. Here, a downstream transmission structure is not described and may correspond to various methods that have been reported up to the present time.

Referring to FIG. 1, the OFDMA-PON system 1 includes an OFDM optical line terminal 12, hereinafter referred to as an OFDM-OLT, and a plurality of OFDM optical network units 10-1, 10-2, 10-3 and 10-4, hereinafter referred to OFDM-ONUs. Each OFDM-ONU is connected to the OFMD-OLT via main feeder optical fiber 13, sub optical feeder fibers 14-1 and 14-2, distribution optical fibers 15-1, 15-2, . . . and 15-8, and passive-optical splitters 16-1,16-2 and 16-3 there between.

In particular, for upstream transmission in accordance with the present disclosure, remote nodes, provided as the passive optical splitters 16-1, 16-2 and 16-3, may be connected in a multi-stage distribution form. In this case, the number of stage may be determined by considering the overall optical power budget and the maximum transmission distance of the link, and may be expressed numerically as 8, 16, 32, 64 and 128.

One of the main concepts of this embodiment of the present disclosure is spectrum allocation for upstream transmission. According to the present disclosure, an FDM+OFDMA access scheme is used. For spectrum allocation in the FDM+OFDMA access scheme, the OFDM-OLT 12 groups the plurality of OFDM-ONUs 10-1, 10-2 and 10-3 into groups. The OFDM-OLT 12 belonging to each group arranges OFDM subcarriers based on predetermined center frequencies for uplink access, and performs upstream transmission using the OFDM subcarriers to communicate with the OFDM-ONUs. In addition, respective FDM signals, which are grouped, include a plurality of OFDM subcarriers as shown in FIG. 1. For example, a subcarrier group 1 (SCG-1) includes an OFDM subcarrier (SC) 1, an OFDM subcarrier (SC) 2, an OFDM subcarrier (SC) 3 and an OFDM subcarrier (SC) 4.

Frequency spacing between respective FDM groups should be carefully determined in consideration of bandwidth of the OFDM signal itself, crosstalk, and optical beat interference (OBI) etc. Since the OFDM-ONU groups are characteristically capable of long-distance and high-capacity transmission, the OFDM-ONU groups may be designated with respect to OFDM subscribers which are distributed adjacent, and the allocation and operation of OFDM subcarriers among the respective groups may be exclusively determined by a media access control (MAC) layer. In addition, the number of OFDM subcarriers that are operated inside the OFDM-ONU groups is determined by the size of (I)FFT of a terminal modem located at the OFDM-OLT 12 and the plurality of OFDM-ONUs 10-1, 10-2, 10-3 and 10-4, due to the characteristics of the OFDM communication method.

As a modulation/detection scheme for signal transmission in accordance with the present disclosure, optical intensity modulation/direct detection (IM/DD) is used due to ensure cost efficiency in uplink transmission and access. To this end, according to the present disclosure, a single longitudinal mode operated directly modulation laser (DML) may be used. Examples of the direct modulation laser may include a distributed feedback laser diode (DFB-LD), a planar lightwave circuit-external cavity laser (PLC-ECL), a distributed Bragg reflector (DBR) laser, and a vertical cavity surface-emitting laser (VCSEL).

Referring to FIGS. 2A to 2C and 3, the configuration of a transmitter including a baseband modulator function block located at the OFDM-ONUs 10-1, 10-2 and 10-3 as well as a receiver including a baseband demodulator block located at the OFDM-OLT 12 will be described in detail.

Figure 2B:
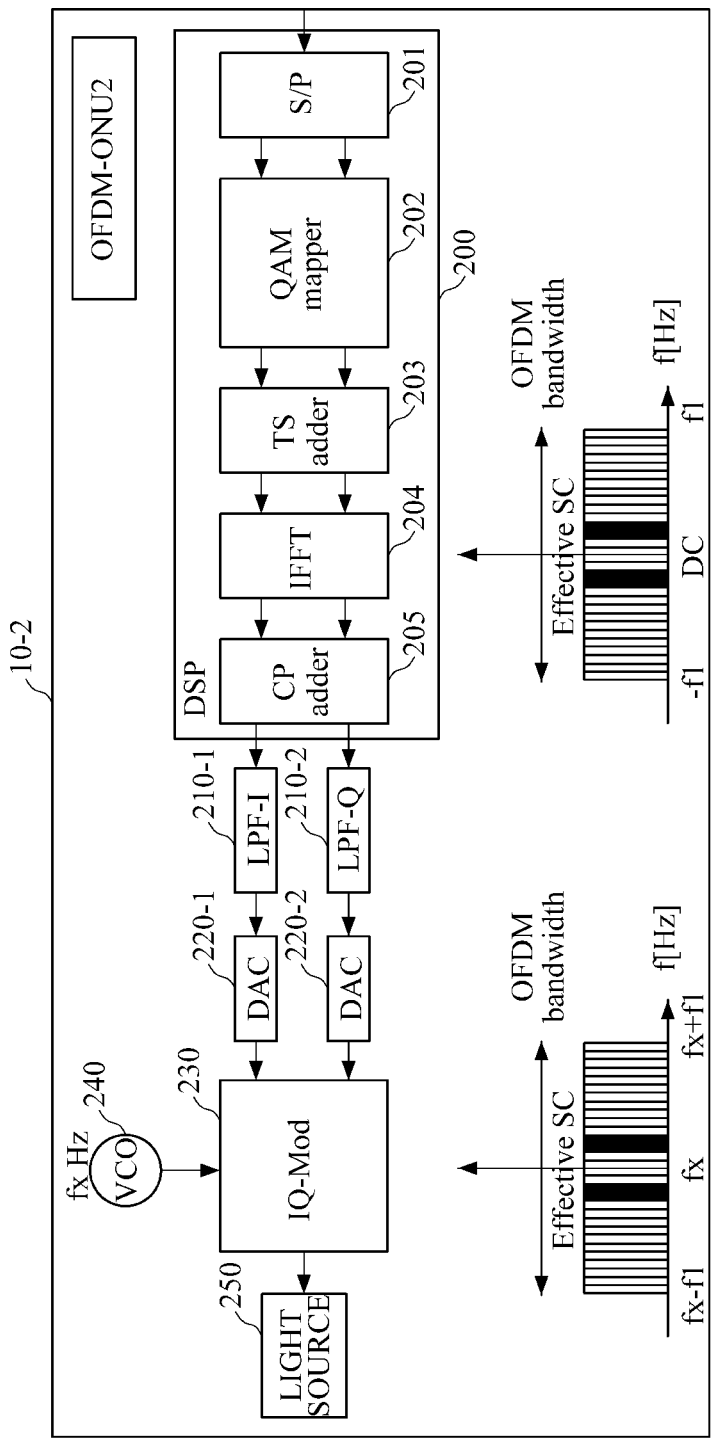
Figure 2C:
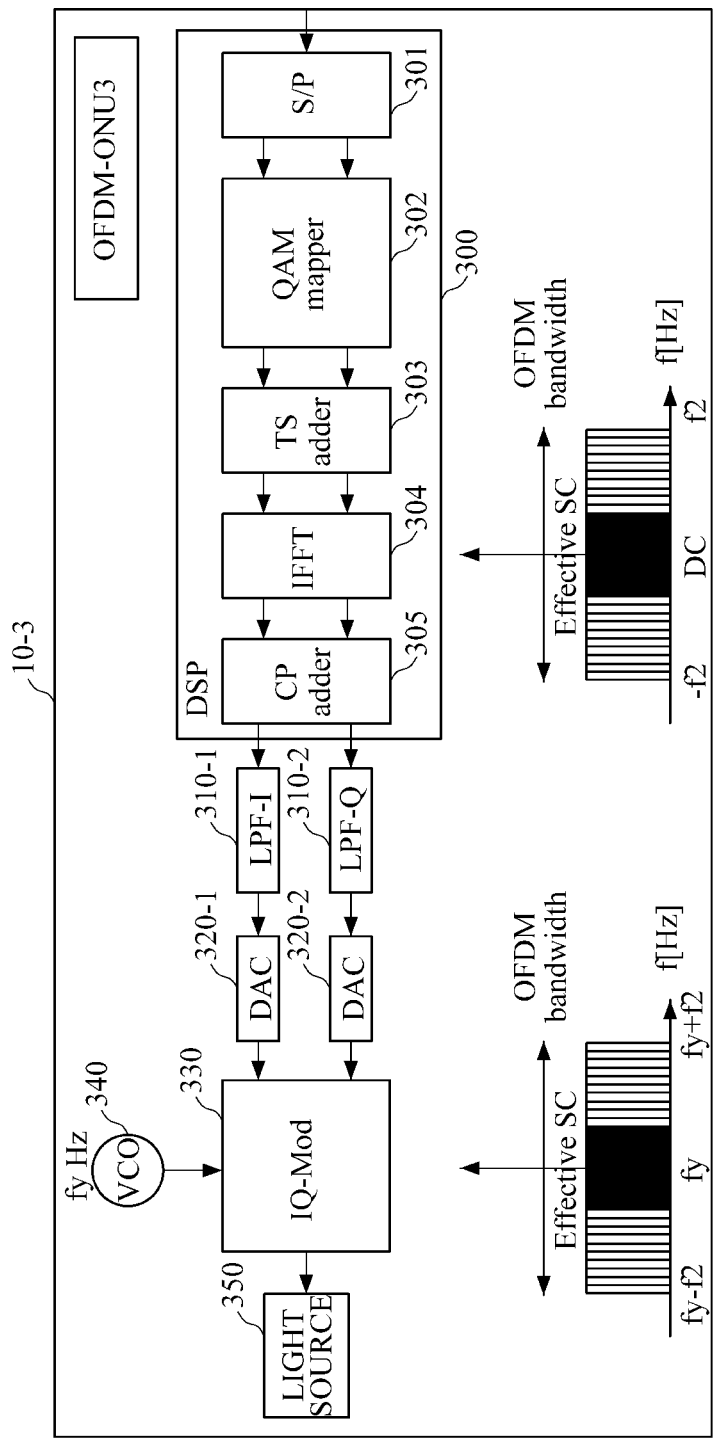

FIGS. 2A to 2C shows detailed function block diagrams illustrating a transmitter of each of the OFDM-ONUs 10-1, 10-2 and 10-3 in accordance with one embodiment of the present disclosure.

Referring to FIGS. 2A to 2C, transmitters of the OFDM-ONUs 10-1, 10-2 and 10-3 include digital signal processors, hereinafter referred to as DSPs, 100, 200 and 300, low-pass filters, hereinafter referred to as LPFs 110-1, 110-2, 210-1, 210-2, 310-1 and 310-2, digital-to-analog converters, hereinafter referred to as DACs 120-1, 120-2, 220-1, 220-2, 320-1 and 320-2, electrical IQ-modulators 130, 230 and 330, voltage controlled oscillators, hereinafter referred to as VCOs, 140, 240 and 340, and light sources 150, 250 and 350.

The DSPs 100, 200 and 300 respectively include serializers/parallelizers (S/P) 101, 201 and 301, QAM mappers 102, 202 and 302, training sequence (TS) adders 103, 203 and 303, inverse fast Fourier transform units (IFFTs) 104, 204 and 304, and cyclic prefix (CP) adders 105, 205 and 305. Most components of the DSPs 100, 200 and 300 have the similar functionalities as components of a general DSP employed in OFDM transmission and therefore will not be described in here. The exception is the IFFTs 104, 204 and 304, which are featured in the present disclosure.

In general, when an OFDM baseband signal is generated to support intensity modulation/direct detection (IM/DD), a discrete multi-tone (DMT) signal generation method using Hermitian Symmetry is mainly used. This method is characterized in that an allocation and operation of actual available effective subcarriers (Effective SC) is allowable only for half size of the IFFT, to remove a imaginary components generated in IFFT operation. Such a characteristic may cause limitations in overall design and operation of an OFDM system including a high-speed and high-capacity DSP capable of real time operation. That is, since allocation and operation is allowable only for half size of the IFFT, the efficiency in the overall operation of the network is lowered and the DSP implementation is made uneconomical.

According to the present disclosure, in order to maximize the efficiency of use of the size of the IFFTs 104, 204 and 304 located at the DSPs 100, 200 and 300, as well as the efficiency of network operation, subcarriers corresponding to the full sizes of the IFFTs 104, 204 and 304 are allocated and operated.

Hereinafter, an analog signal processing module that is part of an internal structure of the transmitter of the OFDM-ONU will be described. In general, in order to support the DSPs 100, 200 and 300 using the full size of the IFFTs 104, 204 and 304, the complex components output from the IFFTs 104, 204 and 304 need to be processed, which requires the use of an expensive optical IQ-modulator in the conventional optical OFDM system.

However, according to the present disclosure, for cost effective implementation of the OFDM-ONU, the electrical IQ modulators 130, 230 and 330 capable of signal processing in an analog domain are used. When compared to conventional DMT signal generation method employing Hermitian Symmetry, an additional cost may be incurred from using DACs 120-2, 220-2 and 320-2 and LPFs 110-2, 210-2 and 310-2 for Q-components, in addition to DACs 120-1, 220-1 and 320-1 and LPFs 110-1, 210-1 and 310-1 for I-components. However, the additional cost in terms of capital expenditure (CAPEX) is expected not to reach the expense cut-down effect due to enhancement of operating efficiency of the network in term of operating expenditure (OPEX), so that upstream transmission in the OFDMA-PON would be cost-effective.

To aid in understanding OFDM signals generated through the transmitters of the OFDM-ONUs 10-1, 10-2 and 10-3 described above, center frequencies for FDM that are allocated to the ONUs, and OFDM subcarriers arranged based on these center frequencies, are illustrated in FIGS. 2A to 2C. For reference, a process of generating baseband signals and a process of shifting from the baseband signals to Intermediate Frequency (IF) signals at the electrical IQ modulators 130, 230 and 330 are illustrated together.

Referring to FIG. 2A, the OFDM-ONU 1 10-1 may use four OFDM subcarriers based on a center frequency $f_x$ in a frequency domain for upstream transmission. Four OFDM subcarriers near DC component in a baseband of the OFDM-ONU1 10-1 are generated in a frequency domain, pass through the DSP 100 and the DACs 120-1 and 120-2, and then are up-shifted into signals having four OFDM subcarriers based on the center frequency $f_x$=IF (Intermediate frequency) through the electrical IQ-modulator 130 to form signals having four OFDM subcarriers.

Referring to FIG. 2B, the OFDM-ONU 2 10-2 may use the four OFDM subcarriers based on the center frequency $f_x$ in the frequency domain as in the OFDM-ONU1 10-1. However, without using the OFDM subcarrier ranges used by the OFDM-ONU 1 10-1, the OFDM-ONU 2 10-2 are allocated its own subcarriers arranged beside the OFDM subcarrier ranges used by the OFDM-ONU 1 10-1, for use. In this case, the empty subcarrier ranges used by the OFDM-ONU1 10-1 may be formed by zero-padding technology.

Referring to FIG. 2C, the OFDM-ONU 3 10-3 is illustrated as using eight OFDM subcarriers based on a center frequency component of $f_y$ in the frequency domain, which is different from the OFDM-ONU 1 10-1 and the OFDM-ONU 2 10-2 for upstream transmission. As described above, the OFDM-ONUs 10-1, 10-2 and 10-3 may easily perform the upstream transmission by use of the OFDM subcarriers allocated thereto based on the center frequencies allocated thereto in advance.

Meanwhile, the OFDM signals up-shifted by the electrical IQ-modulators 130, 230 and 330 are transmitted using the light sources 150, 250 and 350 to the OLT. Examples of the light sources 150, 250 and 350 may include a laser diode (LD).

For EO (electrical to optical) signal conversion, the light sources 150, 250 and 350 used in all the OFDM-ONUs 10-1, 10-2 and 10-3 may be implemented using a directly modulated laser (DML) capable of intensity modulation, or an external modulator including an electro absorption modulator (EAM) or a Mach-zehnder modulator (MZM). In the case of using the external modulator, seed light is needed to drive the external modulator. Examples of the seed light may include a single longitudinal mode operated light source, such as a distributed feedback laser diode (DFB-LD), a vertical cavity surface-emitting laser (VCSEL), and a distributed Bragg reflector (DBR) laser.

In addition, all the light sources basically use the same wavelength. In some cases, ONUs may use a wavelength-tunable light source such that different wavelengths are allocated to the respective ONUs for use. However, according to the present disclosure, a wavelength division multiplexer/de-multiplexer is not used, so as to maintain compatibility of the optical delivery network (ODN) with legacy TDMA-PON, for example, GPON and GEPON, that forms the majority of existing passive optical networks.

Figure 3:
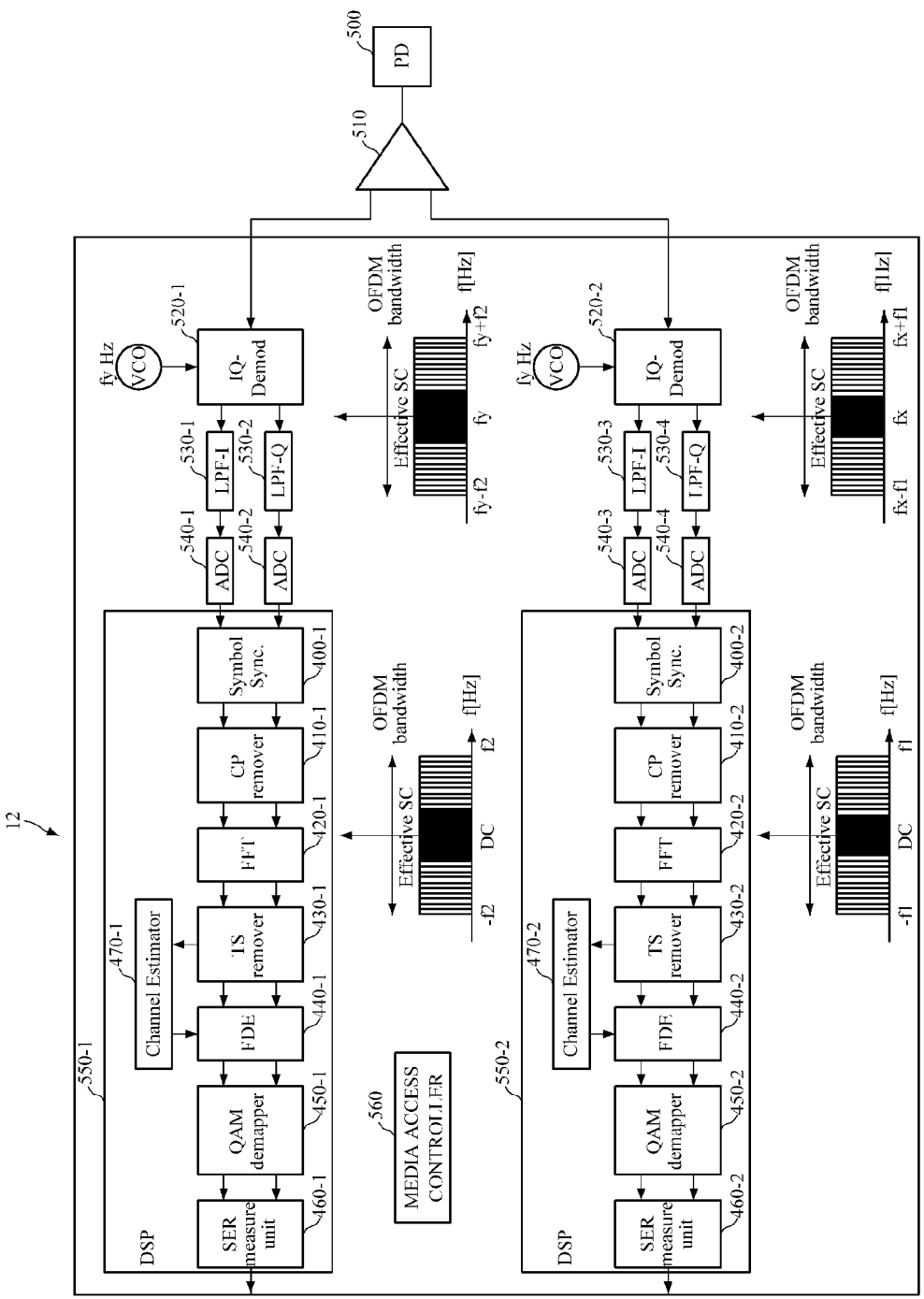
FIG. 3 is a block diagram illustrating a receiver part of an OFDM-OLT in accordance with one embodiment of the present disclosure.

FIG. 3 is a block diagram illustrating a receiver of the OFDM-OLT 12 in accordance with one embodiment of the present disclosure.

Referring to FIG. 3, the receiver of the OFDM-OLT 12 includes an optical detector, for example, a photo diode (PD) 500, an electrical splitter 510, electrical IQ-demodulators 520-1 and 520-2, low-pass filters, hereinafter referred to as LPFs, 530-1, 530-2, 530-3 and 530-4, analog-to-digital converters, hereinafter referred to as ADCs 540-1, 540-2, 540-3 and 540-4, digital signal processors, hereinafter referred to as DSPs 550-1 and 550-2, and a controller 560.

The DSPs 550-1 and 550-2 include symbol synchronizers 400-1 and 400-2, cyclic prefix (CP) removers 410-1 and 410-2, fast Fourier transform units (FFTs) 420-1 and 420-2, training sequence (TS) removers 430-1 and 430-2, frequency domain equalizers (FDEs) 440-1 and 440-2, QAM demappers 450-1 and 450-2, symbol error rate (SER) measurement units 460-1 and 460-2, and channel estimators 470-1 and 470-2. The DSPs 550-1 and 550-2 have similar functionality as a general DSP employed in OFDM transmission and therefore will not be described.

Hereinafter, the functionality of each component of the receiver of the OFDM-OLT 12 will be described in detail.

First, the photo diode 500 detects upstream optical signals that are OFDM modulated by the respective OFDM-ONUs, and converts the detected upstream optical signals into electrical signals.

The OFDM signals converted into the electrical signals by the photo diode 500 are divided into the number of center frequencies that have been used for the FDM method by passing through the electrical splitter 510. For example, since the frequencies $f_x$ and $f_y$ have been used for the FDM by the OFDM-ONUs 10-1, 10-2 and 10-3 in FIGS. 2A to 2C, the OFDM signals converted into the electrical signals by the photo diode 500 pass through the electrical splitter 510 having two divisions. The FDM signals passing through the electrical splitter 510 may pass through an electrical amplifier if necessary.

The divided FDM signals are input to the electrical IQ-demodulators 520-1 and 520-2, respectively, forming front-ends of demodulator. Each of the electrical IQ-demodulators 520-1 and 520-2 separates the signals, which are multiplexed based on center frequencies allocated in advance, according to a respective one of the center frequencies.

For example, the electrical IQ-demodulator 520-2 located at a lower portion on FIG. 3 performs a frequency down-shift on OFDM signals transmitted from the OFDM-ONU1 and the OFDM-ONU2 that have a center frequency of $f_x$, and divides the frequency down-shifted signals into a real-valued component and an imaginary-valued component, and then passed through the LPF 530-3 and 530-4, respectively. The OFDM signals passing through the LPFs 530-3 and 530-4 are converted into digital forms by passing through the ADCs 540-3 and 540-4, and are input to the DSP 550-2 for digital processing such that demodulation of the baseband signal is achieved.

Similarly, the OFDM signals having a center frequency of $f_y$ are input to a demodulation block located at an upper portion of FIG. 3, frequency down-shifted and divided into a real-valued component and an imaginary-valued component by passing through the electrical IQ-demodulator 520-1, and then passed through the LPF 530-1 and 530-2, respectively. The OFDM signals passing through the LPFs 530-1 and 530-2 are converted into digital forms by passing through the ADCs 540-1 and 540-2, and are input to the DSP 550-1 for digital processing such that demodulation of the baseband signal is achieved.

The controller 560 groups the OFDM-ONUs and allocates grouped FDM signals to the respective grouped OFDM-ONUs. The grouped FDM signals include a plurality of OFDM subcarriers. That is, the controller 560 groups a plurality of OFDM-ONUs into groups. At the time of upstream transmission, the OFDM-ONUs belonging to each group arrange OFDM subcarriers based on a certain center frequency, and transmit the OFDM subcarriers upstream, thereby communicating with the OFDM-OLT.

Frequency spacing between respective FDM groups should be carefully determined in consideration of bandwidth of the OFDM signal itself, crosstalk, and optical beat interference (OBI), etc. Since the OFMD-ONU groups are characteristically capable of long-distance and high-capacity transmission, the OFDM-ONU groups may be designated with respect to OFDM subscribers which are distributed adjacent, and the allocation and operation of OFDM subcarriers among the respective groups may be exclusively determined by the media access controller 560. In addition, the number of OFDM subcarriers that are operated inside the OFDM-ONU groups is determined by the size of (I)FFT in a terminal modem DSP located at the OFDM-OLT and the plurality of OFDM-ONUs, due to the characteristics of the OFDM communication method.

The present invention can be implemented as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as those used in Internet transmission. In addition, the computer-readable recording medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical network unit of an orthogonal frequency division multiple access-passive optical network, the optical network unit comprising:
    a digital signal processor configured to generate orthogonal frequency division multiplexing subcarriers that are allocated to the optical network unit within a baseband;
    a digital-to-analog converter configured to convert an orthogonal frequency division multiplexed signal having passed through the digital signal processor into an analog form; and
    an electrical IQ-modulator configured to perform a frequency up-shift on the orthogonal frequency division multiplexed signal, which is converted into the analog form for frequency division multiplexing that is allocated to each optical network unit.

2. The optical network unit of claim 1, wherein the digital signal processor comprises an inverse fast Fourier transform unit configured to generate a plurality of orthogonal frequency division multiplexing subcarriers.

3. The optical network unit of claim 2, wherein allocated ranges of the orthogonal frequency division multiplexing subcarriers generated are allocated by an optical line terminal so as to differ with center frequencies used in each optical network unit without overlapping each other, so that the subcarriers are allocated for a full size of an inverse fast Fourier transform unit.

4. The optical network unit of claim 3, wherein if center frequencies serving as a basis in each optical network unit are the same, allocated ranges of the orthogonal frequency division multiplexing subcarriers generated are allocated without overlapping each other according to a priority order set by the optical line terminal.

5. The optical network unit of claim 2, wherein the electrical IQ-modulator performs a frequency up-shift on the orthogonal frequency division multiplexing subcarriers, which are generated by the inverse fast Fourier transform unit, to form orthogonal frequency division multiplexing subcarriers at a specific center frequency used for the frequency division multiplexing, for a real-valued component and an imaginary-valued component, respectively.

6. The optical network unit of claim 1, further comprising an optical signal processor configured to transmit, toward upstream direction, the orthogonal frequency division multiplexed signal that has been subject to the frequency up-shift by the electrical IQ-modulator.

7. The optical network unit of claim 6, wherein a light source generating an optical signal in the optical signal processor is a directly modulated light source capable of intensity modulation.

8. The optical network unit of claim 7, wherein the optical signal processor, through the directly modulated light source, modulates the orthogonal frequency division multiplexed signal up-shifted by the electrical IQ-modulator into an optical signal having a single wavelength that is allocated to be the same for each optical network unit, and transmits the intensity modulated optical upstream light.

9. The optical network unit of claim 1, further comprising a low-pass filter configured to filter the aliasing component of the orthogonal frequency division multiplexed signal that has passed through the digital signal processor for a real-valued component and an imaginary-valued component, respectively, and to transmit the filtered orthogonal frequency division multiplexed signal to the digital-to-analog converter.

10. An optical line terminal of an orthogonal frequency division multiple access-passive optical network, the optical line terminal comprising:
    an optical detector configured to detect upstream optical signals that are subjected to orthogonal frequency division multiplexing modulation and transmitted by respective optical network units, and to convert the detected upstream optical signals into electrical signals;
    an electrical IQ-demodulator configured to perform a frequency down-shift on the orthogonal frequency division multiplexed signals converted by the optical detector for frequency division multiplexing that are allocated in advance, and to divide the frequency down-shifted orthogonal frequency division multiplexed signals into a real-valued component and an imaginary-valued component;
    an analog-to-digital converter configured to convert the orthogonal frequency division multiplexed signals divided by the electrical splitter into a digital form; and
    a digital signal processor configured to demodulate the orthogonal frequency division multiplexed signals converted into a digital binary signal form by the analog-to-digital converter.

11. The optical line terminal of claim 10, further comprising an electrical splitter configured to divide the orthogonal frequency division multiplexed signals converted into the electrical signals by the optical detector into a predetermined number of orthogonal frequency division multiplexed signals, the predetermined number corresponding to the center frequencies used for the frequency division multiplexing, and to distribute the divided orthogonal frequency division multiplexed signals among a plurality of electrical IQ-demodulators.

12. The optical line terminal of claim 11, wherein the digital signal processor, which is provided in plural, demodulates the orthogonal frequency division multiplexed signals distributed through the electrical splitter based on respective center frequencies used for the frequency division multiplexing.

13. The optical line terminal of claim 10, further comprising a media access controller configured to group the respective optical network units and allocate grouped frequency division multiplexed signals to the grouped respective optical network units, wherein the grouped frequency division multiplexed signals comprise a plurality of orthogonal frequency division multiplexing subcarriers.

14. The optical line terminal of claim 13, wherein the media access controller determines center frequencies of the grouped frequency division multiplexed signal among the grouped respective optical network units, and determines allocation and operation of orthogonal frequency division multiplexing subcarriers in the grouped frequency division multiplexed signals.

15. The optical line terminal of claim 10, further comprising a low-pass filter configured to filter aliasing component of the orthogonal frequency division multiplexed signals divided into the real-valued component and the imaginary-valued component by the electrical IQ-demodulator, and transmit the filtered orthogonal frequency division multiplexed signals to the analog-to-digital converter.

16. An orthogonal frequency division multiple access-passive optical network comprising:
   a plurality of optical network units configured to generate orthogonal frequency division multiplexed signals, which are allocated to the plurality of optical network units, based on center frequencies for frequency division multiplexing that are allocated in advance, and to use the generated orthogonal frequency division multiplexed signals for upstream transmission;
   a plurality of passive optical splitter configured to deliver the orthogonal frequency division multiplexed signals generated by the plurality of optical network units to an optical line terminal; and
   the optical line terminal configured to group the plurality of optical network units and allocate the orthogonal frequency division multiplexed signals among the grouped optical network units;
wherein the optical line terminal comprises
an optical detector configured to convert the orthogonal frequency division multiplexed signals into electrical signals, and
an electrical splitter configured to divide the orthogonal frequency division multiplexed signals converted into the electrical signals by the optical detector into a predetermined number of orthogonal frequency division multiplexed signals, the predetermined number corresponding to the center frequencies for the frequency division multiplexing, and to distribute the divided orthogonal frequency division multiplexed signals among a plurality of electrical IQ-demodulators.

* * * * *